(12) United States Patent
Meyer et al.

(10) Patent No.: US 6,904,822 B2
(45) Date of Patent: Jun. 14, 2005

(54) SIGNAL TRANSMITTER FOR SETTING THE OPERATING STATES OF AN AUTOMATIC SHIFTING DEVICE

(75) Inventors: Jörg Meyer, Wagenfeld (DE); Andreas Giefer, Lemforde (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/433,911

(22) PCT Filed: Sep. 27, 2002

(86) PCT No.: PCT/DE02/03678

§ 371 (c)(1),
(2), (4) Date: Jun. 5, 2003

(87) PCT Pub. No.: WO03/031845

PCT Pub. Date: Apr. 17, 2003

(65) Prior Publication Data

US 2004/0025613 A1 Feb. 12, 2004

(30) Foreign Application Priority Data

Oct. 5, 2001 (DE) .......................................... 101 49 264
Nov. 16, 2001 (DE) .......................................... 101 56 091

(51) Int. Cl.[7] .............................................. B60K 20/00
(52) U.S. Cl. .................... 74/335; 74/473.18; 74/473.35
(58) Field of Search ................................ 74/335, 473.3, 74/473.18, 473.33, 473.35

(56) References Cited

U.S. PATENT DOCUMENTS

| | | | | | |
|---|---|---|---|---|---|
| 3,068,717 A | * | 12/1962 | Meli et al. | ............... | 74/483 PB |
| 3,793,901 A | * | 2/1974 | Muller | ....................... | 74/473.3 |
| 5,462,146 A | * | 10/1995 | Doolittle et al. | ............ | 192/218 |
| 5,809,835 A | * | 9/1998 | Beim et al. | .................... | 74/335 |
| 6,000,296 A | * | 12/1999 | Sundquist | ................ | 74/473.12 |
| 6,046,673 A | * | 4/2000 | Michael et al. | ............. | 340/456 |
| 6,082,213 A | * | 7/2000 | Skogward | ................. | 74/473.18 |
| 6,360,624 B1 | * | 3/2002 | Sedlmaier et al. | ............ | 74/335 |
| 6,588,290 B2 | * | 7/2003 | Wilson et al. | ................ | 74/335 |
| 6,756,698 B2 | * | 6/2004 | Shamoto et al. | ........... | 307/10.6 |
| 2002/0152827 A1 | * | 10/2002 | Hayashi et al. | ............ | 74/473.3 |
| 2003/0172762 A1 | * | 9/2003 | Ehrmaier et al. | ........ | 74/473.33 |

FOREIGN PATENT DOCUMENTS

| | | | |
|---|---|---|---|
| DE | 43 05 903 A1 | 9/1994 | |
| DE | 19821361 A1 * | 11/1998 | ........... B60K/20/02 |
| DE | 197 28 064 A1 | 1/1999 | |
| DE | 197 37 296 A1 | 3/1999 | |
| DE | 199 16 924 A1 | 10/2000 | |
| DE | 100 59 277 A1 | 6/2001 | |
| EP | 0 582 505 | 2/1994 | |
| EP | 0 731 294 A2 | 9/1996 | |
| EP | 0 978 670 A2 | 2/2000 | |
| EP | 1 045 172 A2 | 10/2000 | |
| EP | 1 061 290 A1 | 12/2000 | |
| FR | 2 802 267 A1 | 6/2001 | |
| JP | 05118414 | 5/1993 | |
| JP | 2001304396 | 10/2001 | |
| WO | WO 99/67553 | 12/1999 | |

* cited by examiner

Primary Examiner—Tisha Lewis
(74) Attorney, Agent, or Firm—McGlew and Tuttle, P.C.

(57) ABSTRACT

A signal transmitter for setting the operating states of an automatic gear shifting mechanism having a selector, deflectable in at least three direction, and automatically returnable into a normal position X, by which a shift position R for engaging a reverse gear, a shift position N for the interruption of torque transmission in the gear change mechanism, a shift position D for engaging a forward gear are made. Additionally, the selector can be deflected in a direction for shift position N, N1, N2 for the interruption of torque transmission in the gear change mechanism starting from the normal position X, then another direction different from the first direction and its opposite direction for selecting other shift positions R or D starting from the shift positions N, N1, N2, and again deflected in the first direction after deflecting to other direction for selecting the other shift positions R or D.

41 Claims, 8 Drawing Sheets

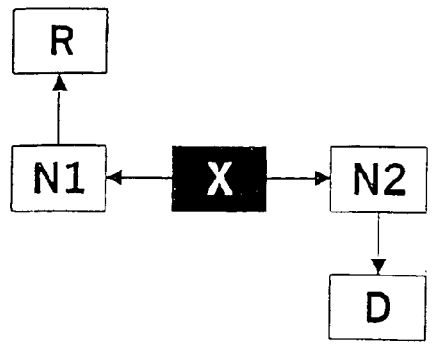
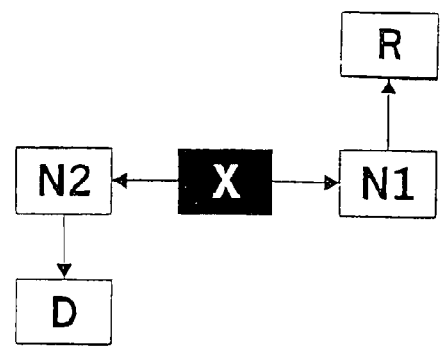
Fig.13    Fig.14
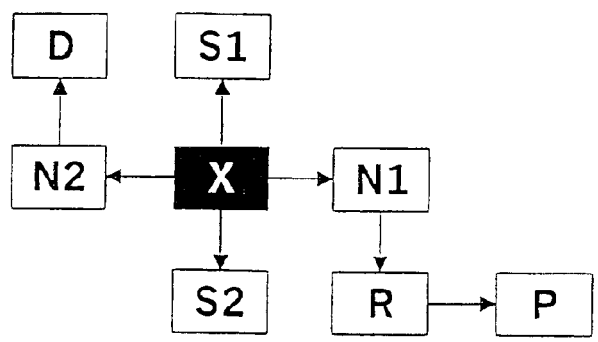
Fig.15
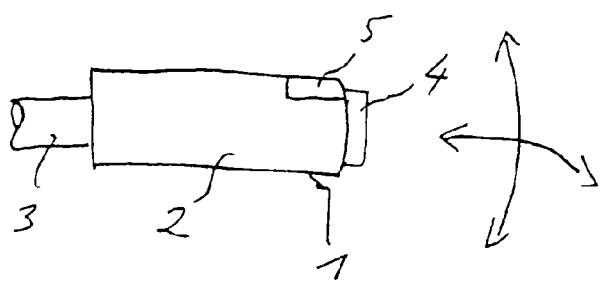
Fig.16

SIGNAL TRANSMITTER FOR SETTING THE OPERATING STATES OF AN AUTOMATIC SHIFTING DEVICE

FIELD OF THE INVENTION

The present invention pertains to a signal transmitter for setting the operating states of an automatic shifting device of a gear change mechanism with a selection means automatically returning into a normal position at least for certain shift positions.

BACKGROUND OF THE INVENTION

Gear change mechanisms with an automatic shifting device are widely used especially in the manufacture of motor vehicles. Such shifting devices usually have an operating state R for engaging the at least one reverse gear, an operating state N for interrupting the torque transmission in the gear change mechanism, and an operating state D for engaging a forward gear. An operating state P for engaging the parking brake is additionally frequently provided.

If, e.g., the operating state D for engaging a forward gear is activated, the automatic shifting device of the gear change mechanism automatically selects the forward gear that appears most suitable from the available forward gears as a function of certain parameters of the vehicle, e.g., the instantaneous velocity or the acceleration, corresponding to one or more preset shifting programs, and controls the gear change mechanism correspondingly. The driver of the vehicle can frequently select separate shifting programs for summer and winter and/or sports driving and economic driving.

Such shifting devices are controlled by means of signal transmitters. While the control by the signal transmitter used to be performed mechanically by means of cables, electronic transmission of the signals is now preferred, because this permits the flexible arrangement of the signal transmitter. For the selection of the particular operating state R N D P of the automatic shifting device, such a signal transmitter has a gearshift lever usually provided at a center console of the vehicle. The functions of the gearshift lever corresponding to the individual operating states are arranged, as a rule, linearly in the longitudinal direction of the vehicle and can be selected by a movement of the gearshift lever in the longitudinal direction of the vehicle. In conventional signal transmitters, a function is considered to be selected only as long as the gearshift lever is located in the position designating the particular function.

A corresponding signal transmitter is described in DE 197 37 296 C2. This prior-art signal transmitter has, moreover, the possibility of leaving the automatic shifting program preset for engaging the forward gears and to shift the gears upward and/or downward manually by tapping the gearshift lever. The particular shifting operation is triggered by sending a pulse, so that the gearshift lever does not need to remain in the particular position but can automatically return into its starting position.

It is necessary for this that the automatic shifting device of the gear change mechanism be designed in the form of an electronic control device, and that the gearshift lever of the signal transmitter sends a particular control signal to the electronic control device via associated electric contacts.

Moreover, efforts have been made in recent years to replace the gearshift lever of the signal transmitter arranged at the center console with a selector lever fastened to the steering column, e.g., in order to achieve a greater freedom in designing the interior space of the vehicle.

A signal transmitter with such a selector lever is described in DE 199 16 924 A1. The operating states of the automatic shifting device of the automatically shifted transmission can be selected by deflecting the selector lever, and the selector lever can be moved along a shift gate for selecting individual functions R N D P in at least two deflection directions, and it always returns automatically into the same starting position from both deflection directions. The same operating state of the automatic shifting device of the automatically shifted transmission is assigned to each deflection direction of the selector lever in the shift gate for preselecting individual functions R N D P during the automatic operation, and two different functions can be selected in at least one deflection direction of the selector lever by the selector lever being moved over a first section up to a first stop in the deflection direction for selecting a first function, and by the selector lever being moved over a second, greater section up to a second stop in the same deflection direction for selecting a second function, while the first stop is pressed down. The individual functions are thus arranged along a straight path of movement.

The automatic shifting device of the automatically shifted transmission is controlled via impulses in this case as well, which are sent by the signal transmitter corresponding to the movement of the selector lever, so that the selector lever can return into its starting position after the selection of a function.

The drawback of the prior-art signal transmitters for setting the operating states of an automatic shifting device of a gear change mechanism with a selection means automatically returning into a normal position is that an unintended operating state may be inadvertently selected by an unintended movement over a first position (or the starting position) of the selection means.

SUMMARY OF THE INVENTION

The object of the present invention is to provide a signal transmitter for setting the operating states of an automatic shifting device of a gear change mechanism, which effectively avoids the unintended selection of an operating state and enables the driver to perform intuitive shifting.

According to a first preferred exemplary embodiment of the present invention, a signal transmitter for setting the operating states of an automatic shifting device of a gear change mechanism has a selection means, which can be deflected in at least three directions, returns automatically into a normal position at least for certain shift positions, and by means of which at least one shift position for engaging a reverse gear, a shift position for interrupting the torque transmission in the gear change mechanism, and a shift position for engaging a forward gear can be selected, wherein the selection means can be deflected starting from the normal position in a first direction for selecting the shift position for the interruption of the torque transmission in the gear change mechanism, and the selection means can be deflected in a direction different from the first direction, which is not the direction opposite the first direction, starting from the shift position for the interruption of the torque transmission in the gear change mechanism for selecting one of the other shift positions.

To select the drive-transmitting operating states of the automatic shifting device of the gear change mechanism, it is consequently necessary to bring the selection means from a stable normal position first into an unstable shift position for the interruption of the torque transmission in the gear change mechanism by deflection in a first deflection direction, and then into another unstable shift position (e.g., for engaging a forward gear) by deflection in another direction different from the first deflection direction. The additional deflection direction must not be the direction opposite the first deflection direction, because the normal position would. otherwise again be reached.

Thus, the deflection direction of the selection means must always be changed during the shifting of the signal transmitter according to the present invention between individual shift positions, so that an unintended "shifting through" the individual shift positions is effectively avoided and intuitive shifting becomes possible.

Since the drive-transmitting operating states are, moreover, always shifted via the shift position for the interruption of the torque transmission in the gear change mechanism (idle), the risk of damage to the gear change mechanism due to an operating error in operating the selection means is further reduced regardless of an electronic safety circuit that may be additionally present.

After its deflection, the selection means automatically returns into the normal position, so that the operation of the selection means is uncoupled from the activated operating state of the automatic shifting device of the gear change mechanism.

In a first preferred embodiment, the selection means can be deflected for selecting the shift position for engaging a reverse gear starting from the shift position for the interruption of the torque transmission in the gear change mechanism in a second direction, which is not the opposite direction to the first direction and is different from the first direction, and the selection means can be deflected for selecting the shift position for engaging a forward gear starting from the shift position for the interruption of the torque transmission in the gear change mechanism in a third direction, which is a direction different from the first and second directions and is not the opposite direction to the first direction.

This shifting scheme permits, among other things, the linear arrangement of the shift positions for engaging a reverse gear, for the interruption of the torque transmission in the gear change mechanism and for engaging a forward gear and consequently a compact design of the selection means of the signal transmitter.

The signal transmitter is preferably designed such that additional devices can be controlled by means of the selection means in addition to the setting of the operating states of the automatic shifting device of the gear change mechanism.

As a result, it is possible according to the present invention to design the selection means of the signal transmitter as a multifunctional shifting element and to additionally perform, e.g., the setting of a chassis regulator, an air conditioner, a navigation system or radio. As a result, the number of selection means needed for operating the particular devices can be reduced.

It is especially advantageous according to the present invention if a shift position for a first additional function and a shift position for a second additional function can be selected by means of the selection means, wherein the selection means can be deflected for selecting the shift position for a first additional function starting from the normal position in a direction that is the same as the second direction, and the selection means can be deflected for selecting the shift position for a second additional function starting from the normal position in a direction that is the same as the third direction.

This permits the direct control of the additional devices of a vehicle, and an unintended selection of the operating states of the automatic shifting device of the gear change mechanism is additionally prevented.

According to a second preferred embodiment, a first shift position and a second shift position are provided for the interruption of the torque transmission in the gear change mechanism, wherein the selection means can be deflected starting from the normal position in a first and second directions for selecting the first or second shift position for the interruption of the torque transmission in the gear change mechanism, wherein the first direction is different from the second direction, and the selection means can be deflected starting from the first shift position for the interruption of the torque transmission in the gear change mechanism in a third direction for selecting the shift position for engaging a reverse gear, which said third direction is different from the first and second directions and is not the opposite direction to the first and second directions, and the selection means can be deflected starting from the second shift position for the interruption of the torque transmission in the gear change mechanism in a direction that is the same as the third direction for selecting the shift position for engaging a forward gear.

Due to the provision of two shift positions for the interruption of the torque transmission in the gear change mechanism, it is possible to considerably increase the number of shift patterns that can be embodied with the signal transmitter according to the present invention. Furthermore, the risk of operating errors can be further reduced, because a user must decide already before the selection of a shift position for the interruption of the torque transmission in the gear change mechanism whether he would like to reach a shift position for engaging a forward or reverse gear.

It is especially advantageous if a shift position for engaging a parking brake can be additionally selected by means of the selection means, because all typical operating states of an automatic shifting device of a gear change mechanism can thus be selected by means of the selection means.

The selection means is preferably deflectable for selecting the shift position for engaging a parking brake starting from the shift position for engaging a reverse gear in a direction that is the same as the first direction.

As a result, it is guaranteed, on the one hand, that a further change of the deflection direction of the selection means is necessary for engaging a parking brake starting from the shift position for engaging the reverse gear, as a result of which an unintended engagement of the parking brake can be prevented. On the other hand, it is thus possible to maintain the order of the shift positions, which is commonly used in conventional selection means for the operating state of an automatic transmission, in which order the shift position for engaging a parking brake and the shift position for engaging a reverse gear are adjacent to each As an alternative, the selection means may be deflectable starting from the normal position in a direction that is the same as the third direction for selecting the shift position for engaging a parking brake.

This permits the direct engagement of the parking brake starting from the normal position.

According to a second preferred exemplary embodiment, the selection means is deflectable in four directions.

This makes it possible to further increase the number of shift patterns of the selection means that can be embodied with the signal transmitter according to the present invention.

In this second exemplary embodiment, the selection means is deflectable preferably starting from the normal position in a fourth direction, which is different from the first, second and third directions described above, for selecting the shift position for engaging a parking brake.

Thus, it is again possible to reach the shift positions for engaging a parking brake directly starting from the normal position.

According to a preferred embodiment of the second exemplary embodiment, a first shift position and a second shift position are provided for interrupting the torque transmission in the gear change mechanism, wherein the selection means can be deflected for selecting the first or second shift position for the interruption of the torque transmission in the gear change mechanism starting from the normal position in a first or second direction, wherein the first direction is different from the second direction, and the selection means can be deflected for engaging a reverse gear starting from the first shift position for the interruption of the torque transmission in the gear change mechanism in a third direction, which is different from the first and second directions and not the opposite direction to the first and second directions, and the selection means can be deflected for selecting the shift position for engaging a forward gear starting from the second shift position for the interruption of the torque transmission in the gear change mechanism in a fourth direction, which is different from the first, second and third directions, and is not the opposite direction to the first and second directions.

It is thus possible to embody shifting arrangements in which the shift position for engaging a reverse gear and the shift position for engaging a forward gear are arranged point-symmetrically in relation to the normal position of the selection means, and are thus located opposite each other, as a result of which the intuitive operation of the selection means of the signal transmitter according to the present invention is additionally facilitated.

A shift position for engaging a parking brake is preferably also selectable according to the second exemplary embodiment, in which case the selection means can be deflected for selecting the shift position for engaging a parking brake starting from the shift position for engaging a reverse gear in a direction that is the same as the aforementioned first or second direction.

Furthermore, it is also especially advantageous according to the second exemplary embodiment if a shift position for a first additional function and a shift position for a second additional function can be additionally selected by means of the selection means, and the selection means can be deflected for selecting the shift position for a first additional function starting from the normal position in a direction that is the same as the third direction, and the selection means can be deflected for selecting the shift position for a second additional function starting from the normal position in a direction that is the same as the fourth direction, so that additional devices can be controlled by means of the selection means of the signal transmitter according to the present invention.

In an alternative embodiment, the signal transmitter according to the present invention additionally has a park button, and a parking brake can be engaged by pressing the park button.

Due to the provision of a park button, it is not necessary to form a separate shift position for engaging the parking brake for the selection means, as a result of which the shift pattern of the selection means can be simplified.

Furthermore, the accidental engagement of the parking brake can be prevented by the provision of a separate park button. The park button is preferably arranged at the selection means.

To additionally prevent the accidental engagement of the shift position for engaging a reverse gear during the deflection of the selection means, it is advantageous for the signal transmitter to additionally have a reverse lock button for the selection means to be able to be deflected for selecting the shift position for engaging a reverse gear only when the reverse lock button is pressed. The reverse lock button is preferably arranged at the selection means.

The signal transmitter according to the present invention is preferably mounted in a vehicle.

It is advantageous for the shift position for engaging a reverse gear to be arranged in the direction of forward travel of the vehicle in relation to the normal position and for the shift position for engaging a forward gear to be arranged in the direction of reverse travel of the vehicle in relation to the normal position, because this corresponds to the conventional arrangement of the corresponding shift position in the case of a conventional gearshift lever of an automatic transmission.

It is, of course, also possible according to the present invention to transpose this arrangement, so that the shift position for engaging a reverse gear is arranged in the direction of reverse travel of the vehicle in relation to the normal position, and the shift position for engaging a forward gear is arranged in the direction of forward travel of the vehicle in relation to the normal position, which is better suited to the actual mode of operation of the particular shift position.

The selection means is preferably designed in the form of a steering column arm fastened to a steering column of a vehicle, because this permits the operation of the selection means without a driver having to remove his hands from the steering wheel.

As an alternative, it is also possible to design the selection means in the form of a gearshift lever arranged at the center console of the vehicle.

According to a preferred exemplary embodiment of the present invention, a signal transmitter for engaging the operating states of an automatic shifting device of a gear change mechanism has a selection means, which can be deflected in at least three directions, automatically returns into a normal position at least for certain shift positions, and by means of which at least one shift position for engaging a reverse gear, a shift position for interrupting the torque transmission in the gear change mechanism and a shift position for engaging a forward gear can be selected, wherein the selection means can be deflected in a first direction starting from the normal position for selecting the shift position for interrupting the torque transmission in the gear change mechanism, and the selection means can be deflected at first in another direction which is different from the first direction and is not the opposite direction to the first direction starting from the normal position for the interruption of the torque transmission in the gear change mechanism for selecting one of the other shift positions, and it can again be deflected in the first direction after the deflection in the respective other direction.

To select the drive-transmitting operating states of the automatic shifting device of the gear change mechanism, it is thus necessary to bring the selection means from a stable normal position first into an unstable shift position for the interruption of the torque transmission in the gear change mechanism by deflection in a first deflection direction and to subsequently bring it into another unstable shift position (e.g., for engaging a forward gear) first by deflection in another direction different from the first deflection direction and subsequently by deflection in the first direction. The additional deflection direction must not be the opposite direction to the first deflection direction, because the normal position would otherwise again be reached.

Thus, the deflection direction of the selection means must first always be changed during the deflection of the selection means between individual shift positions, so that the shifting of the signal transmitter according to the present invention is brought about by an essentially stepwise deflecting movement of the selection means between two consecutive shift positions. Furthermore, the basic deflection direction of the selection means for selecting shift positions arranged adjacent to each other is preferably the same. Consequently, it is possible with the signal transmitter according to the present invention to always deflect the selection means up to a stop of a shift position, so that an unintended "shifting through" the individual shift positions is effectively prevented and intuitive shifting becomes possible. Since, moreover, the drive-transmitting operating states are always shifted via the shift position for the interruption of the torque transmission in the gear change mechanism (idle), the risk for damage to the gear change mechanism due to operating error in operating the selection means is further reduced regardless of an electronic safety circuit that may be additionally present.

After the deflection of the selection means, the latter automatically returns into its normal position, so that the operation of the selection means is uncoupled from the activated operating state of the automatic shifting device of the gear change mechanism.

In a first preferred embodiment, the selection means can be deflected for selecting the shift position for engaging a reverse gear starting from the shift position for the interruption of the torque transmission in the gear change mechanism first in a second direction that is not the opposite direction to the first direction and is different from the first direction, and after the deflection in the second direction, it can again be deflected in the first direction, and, furthermore, the selection means can be deflected for selecting the shift position for engaging a forward gear starting from the shift position for the interruption of the torque transmission in the gear change mechanism first in a third direction, which is a direction different from the first and second directions and is not the opposite direction to the first direction, and it can again be deflected in the first direction after the deflection in the third direction.

This shifting scheme permits, among other things, the compact design of the selection means of the signal transmitter.

The signal transmitter is preferably designed such that additional devices can be controlled by means of the selection means in addition to the setting of the operating states of the automatic shifting device of the gear change mechanism.

As a result, it is possible according to the present invention to design the selection means of the signal transmitter as a multifunctional shifting element and to additionally perform, e.g., settings of a chassis regulation, an air conditioner, a navigation system or a radio. As a result, the number of selection means needed for operating the particular devices can be reduced.

It is especially advantageous according to the present invention if a shift position for a first additional function and a shift position for a second additional function can be additionally selected by means of the selection means, wherein the selection means can be deflected for selecting the shift position for a first additional function starting from the normal position in a direction that is the same as the second direction, and the selection means can be deflected for selecting the shift position for a second additional function starting from the normal position in a direction that is the same as the third position.

This permits the direct control of the additional devices of a vehicle, and the unintended selection of the operating states of the automatic shifting device of the gear change mechanism is additionally prevented.

According to a second preferred embodiment, a first shift position-and a second shift position are provided for the interruption of the torque transmission in the gear change mechanism, wherein the selection means can be deflected for selecting the first or second shift position for the interruption of the torque transmission in the gear change mechanism starting from the normal position in a first and second directions, wherein the first direction is not the same as the second direction, and the selection means can be deflected for selecting the shift position for engaging a reverse gear starting from the first shift position for the interruption of the torque transmission in the gear change mechanism first in a third direction, which is different from the first and second directions and is not the opposite direction to the first and second directions, and it can again be deflected in the first or second direction after deflection in the third direction, and the selection means can be deflected for selecting the shift position for engaging a forward gear starting from the second shift position for the interruption of the torque transmission in the gear change mechanism first in a direction that is the same as the third direction, and after the deflection in the third direction, it can again be deflected in the first or second direction.

Due to the provision of two shift positions for the interruption of the torque transmission in the gear change mechanism, it is possible to considerably increase the number of shift patterns that can be embodied with the signal transmitter according to the present invention. Furthermore, the risk for operating errors can be further reduced, because a user must decide already before the selection of a shift position for the interruption of the torque transmission in the gear change mechanism whether he would like to reach a shift position for engaging a forward or reverse gear.

It is especially advantageous if a shift position for engaging a parking brake can be additionally selected by means of the selection means, because all typical operating states of an automatic shifting device of a gear change mechanism can thus be selected by means of the selection means.

The selection means can be preferably deflected first into the respective other direction starting from the shift position for engaging a reverse gear for selecting the shift position for engaging a parking brake, and it can be deflected after the deflection in the respective other direction in a direction that is the same as the first direction or is the opposite direction to the first direction. As a result, it is guaranteed, on the one hand, that a change in the deflection direction of the selection means is first necessary for engaging a parking brake starting from the shift position for engaging the reverse gear while maintaining the basic deflection direction of the selection means, as a result of which the unintended engagement of the parking brake can be avoided. On the other hand, it is thus possible to maintain the order of the shift positions, which is commonly used in conventional selection means for the operating state of an automatic transmission, in which order the shift position for engaging a parking brake and the shift position for engaging a reverse gear are adjacent to each other.

According to a second preferred exemplary embodiment, the selection means can be deflected in four directions.

This makes it possible to further increase the number of the shift patterns of the selection means that can be embodied with the signal transmitter according to the present invention.

According to a preferred embodiment of the second exemplary embodiment, a first shift position and a second shift position are provided for the interruption of the torque transmission in the gear change mechanism, wherein the selection means can be deflected for selecting the first or second shift position for the interruption of the torque transmission in the gear change mechanism starting from the normal position in a first or second direction, wherein the first direction is not the same as the second direction, and the selection means can be deflected for selecting the shift position for engaging a reverse gear starting from the first shift position for the interruption of the torque transmission in the gear change mechanism first in a third direction, which is different from the first and second directions and is not the opposite direction to the first and second directions, and after the deflection in the third direction, it can again be deflected in the first or second direction, and the selection means can be deflected for selecting the shift position for engaging a forward gear starting from the second shift position for the interruption of the torque transmission in the gear change mechanism first in a fourth position, which is different from the first, second and third directions and is not the opposite direction to the first and second directions, and after the deflection in the fourth direction, it can again be deflected in the first or second direction.

It is thus possible to embody shifting arrangements in which the shift position for engaging a reverse gear and the shift position for engaging a forward gear are arranged point-symmetrically in relation to the normal position of the selection means, and are thus located opposite each other, as a result of which the intuitive operation of the selection means of the signal transmitter according to the present invention is additionally facilitated.

A shift position for engaging a parking brake can preferably also be selected according to the second exemplary embodiment, and the selection means can be deflected for selecting the shift position for engaging a parking brake starting from the shift position for engaging a reverse gear first in the third or fourth direction, and after the deflection in the third or fourth direction, it can be deflected in a direction that is the same as the first or second direction.

Furthermore, it is also especially advantageous according to the second exemplary embodiment if a shift position for a first additional function and a shift position for a second additional function can be selected by means of the selection means, and the selection means can be deflected for selecting the shift position for a first additional function starting from the normal position in a direction that is the same as the third direction, and the selection means can be deflected for selecting the shift position for a second additional function starting from the normal position in a direction that is the same as the fourth position, so that additional devices can be controlled by means of the selection means of the signal transmitter according to the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 13 is a view showing another alternative embodiment to the shift pattern shown in FIG. 3 with the use of a selection means of a signal transmitter according to the present invention, which said selection means can be deflected in four directions;

FIG. 14 is a view showing another alternative embodiment to the shift pattern shown in FIG. 3 with the use of a selection means of a signal transmitter according to the present invention, which said selection means can be deflected in four directions;

FIG. 15 is a view showing a shift pattern of a selection means of a signal transmitter according to the present invention, which said selection means can be deflected in four directions, and in which said signal transmitter a first shift position and a second shift position are provided for the interruption of the torque transmission in the gear change mechanism, wherein the signal transmitter permits the control of additional devices, and it additionally has a shift position for engaging a parking brake;

FIG. 16 is a view showing a steering column arm as can be used as a selection means of the signal transmitter according to the present invention;

DESCRIPTION OF THE PREFERRED EMBODIMENTS

Figure 1:
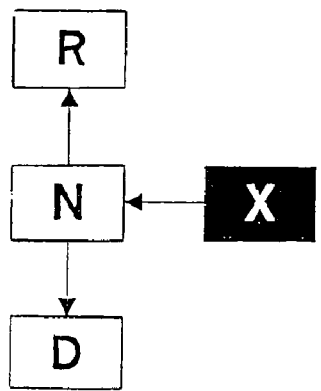
FIG. 1 is a view showing a shift pattern of a selection means of a signal transmitter according to the present invention, which said signal transmitter can be deflected in three directions.

Referring to the drawings in particular, FIGS. 1–15 show a selection of different shift patterns as they can be embodied with the signal transmitter according to the present invention.

The fields with a white background show unstable positions of the selection means, i.e., positions in which the selection direction is maintained and the selector remains in the position only as long as it is held there. The fields with a white background are designated by the letters R, N, N1, N2, D, P, S1, S2. R denotes here a shift position for engaging a reverse gear; N, N1, N2 denote shift positions for the interruption of the torque transmission in the gear change mechanism; D denotes a shift position for engaging a forward gear; P denotes a shift position for engaging a parking brake; and S1, S2 denote shift positions for first and second additional functions. The fields with a black background, which are designated by X, symbolize the particular stable normal position of the selection means, i.e., the particular position in a shift pattern at which the selection means remains when it is not deflected or into which the selection means returns after it had been deflected into an unstable position.

The arrows in FIGS. 1–15 indicate the directions in which the selection means or selector can be deflected starting from a particular position.

FIGS. 1–6 show shift patterns as can be embodied with a signal transmitter whose selection means can be deflected in three directions only. Besides the simple design of the selection means, the small space requirement for the shift patterns that can be embodied is especially advantageous in the signal transmitters with a selection means that can be deflected in three directions.

FIG. 1 shows a possible shift pattern according to a first preferred embodiment of a signal transmitter according to the present invention, in which the selection means can be deflected starting from the normal position X in a first direction for selecting the shift position N for the interruption of the torque transmission in the gear change mechanism and in a second direction starting from the shift position N for selecting the shift position R for engaging a reverse gear, wherein the second direction is not the opposite direction to the first direction and is different from the first direction. The first direction shown in FIG. 1 may be, e.g., a direction toward an operator of the selection means (driver side), and the second direction may be a forward travel direction of a vehicle, in which the signal transmitter according to the present invention is mounted.

To select the shift position D for engaging a forward gear, the selection means can be deflected starting from the shift position N in a third direction, which is a direction different from the first and second directions and is not the opposite direction to the first direction. The third direction in the shift pattern shown in FIG. 1 is the opposite direction to the second direction and consequently a direction oriented in the reverse (or rearward) travel direction of the vehicle.

Figure 2:
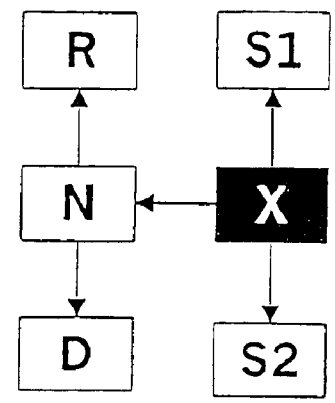
FIG. 2 is a view showing a shift pattern of the selection means of a signal transmitter according to the present invention, which said signal transmitter permits the control of additional devices.

An especially preferred embodiment of the shift pattern shown in FIG. 1 is shown in FIG. 2.

FIG. 2 differs from FIG. 1 in that additional devices can be controlled or additional functions can be selected by means of the selection means of the signal transmitter according to the present invention in addition to the setting of the operating states of the automatic shifting device of the gear change mechanism. A first shift position S1 for a first additional function and a second shift position S2 for a second additional function can be additionally selected for this purpose by means of the selection means, wherein the selection means can be deflected for selecting the shift position S1 starting from the normal position X in a direction that is the same as the second direction in FIG. 1 and is thus the same as the forward travel direction of the vehicle. To select the shift position S2, the selection means can be deflected starting from the normal position X in a direction that is the same as the third direction in FIG. 1 and is thus the same as the reverse (or rearward) travel direction.

The shift positions S1 and S2 may be used, e.g., for the manual shifting of the gear change mechanism, but also to operate a navigation system, a chassis regulation, an air conditioner or the control of another device.

Figure 3:
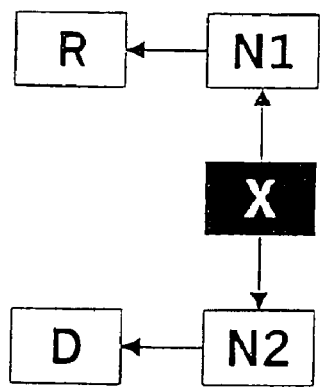
FIG. 3 is a view showing a shift pattern of a selection means of a signal transmitter according to the present invention, which said selection means can be deflected in three directions and in which said signal transmitter has a first shift position and a second shift position provided for the interruption of the torque transmission in the gear change mechanism.

An embodiment that is an alternative to FIG. 1 is shown in FIG. 3. The shift pattern shown in FIG. 3 differs from the shift pattern shown in FIG. 1 basically in that two shift positions N1, N2 are provided for the interruption of the torque transmission in the gear change mechanism. To select the shift position N1 or N2, the selection means can be deflected starting from the normal position X in a first or second direction, wherein the first direction is not the same as the second direction. In the embodiment shown in FIG. 3, the second direction is the opposite direction to the first direction. To select the shift position R, the selection means can be deflected starting from the shift position N1 in a third direction, which is different from the first and second directions and is not the opposite direction to the first and second directions. To select the shift position D, the selection means can be deflected starting from the shift position N2 in a direction that is likewise the same as the third direction.

Figure 4:
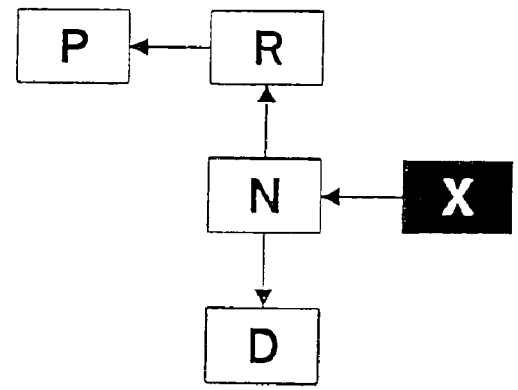
FIG. 4 is a view showing a shift pattern of a selection means of a signal transmitter according to the present invention, which said selection means can be deflected in three directions and which said signal transmitter additionally has a shift position for engaging a parking brake.

FIG. 4 shows a shift pattern that differs from the shift pattern shown in FIG. 1 in that a shift position P for engaging a parking brake can be additionally selected by means of the selection means. The selection means can be deflected for selecting the shift position P starting from the shift position R in a direction that is the same as the first direction in FIG. 1 and is consequently oriented toward an operator of the selection means (driver side).

Figure 5:
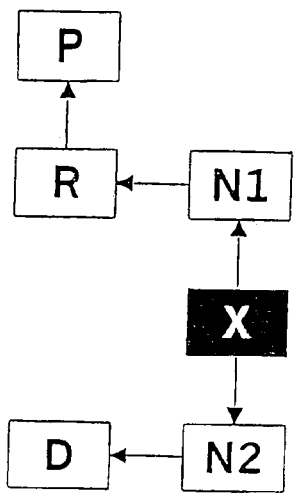
FIG. 5 is a view showing a shift pattern of a selection means of a signal transmitter according to the present invention, which said selection means can be deflected in three directions, and in which said signal transmitter has a first shift position and a second shift position provided for the interruption of the torque transmission in the gear change mechanism and which said signal transmitter additionally has a shift position for engaging a parking brake.

FIG. 5 shows a variant of the shift pattern shown in FIG. 3, which has a shift position P for engaging a parking brake analogously to FIG. 4.

Figure 6:
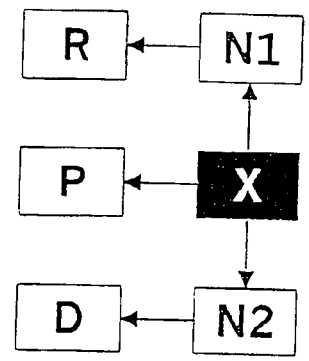
FIG. 6 is a view showing an alternative embodiment to the shift pattern shown in FIG. 5.

FIG. 6 shows a shift pattern that permits directly the selection of the shift position P starting from the normal position X due to the deflection of the selection means in a direction that was called the "third direction" in connection with FIG. 3. An extremely small space requirement can be considered to be the advantage of the shift pattern according to FIG. 6.

FIGS. 7–15 show shift patterns as they can be embodied with a signal transmitter according to the present invention, whose selection means is deflectable in four directions. This makes it possible to further increase the number of shift patterns that can be embodied.

Figure 7:
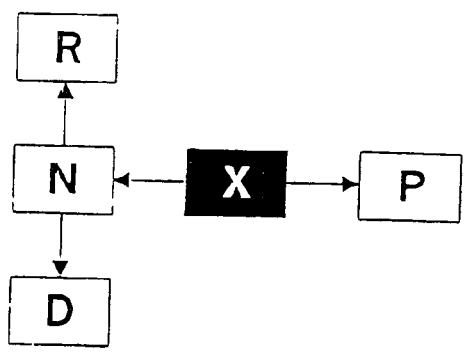
FIG. 7 is a view showing an alternative embodiment to the shift pattern shown in FIG. 4 with the use of a selection means of a signal transmitter according to the present invention, which said selection means can be deflected in four directions.

The shift pattern shown in FIG. 7 uses the shifting described in connection with FIG. 1 and differs from this in that the selection means can be deflected for selecting the shift position P starting from the normal position X in a fourth direction, which is different from the first, second and third directions described in connection with FIG. 1. The fourth direction in FIG. 7 corresponds to the deflection of the selection means away from an operator of the selection means and consequently toward the passenger side.

Figure 8:
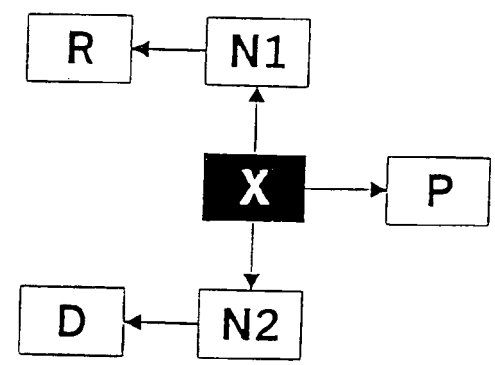
FIG. 8 is a view showing an alternative embodiment to the shift pattern ,shown in FIG. 6 with the use of a selection means of a signal transmitter according to the present invention, which said selection means can be deflected in four directions.

The shift pattern described in connection with FIG. 3 is again used in FIG. 8, and the shift pattern shown in FIG. 8 shows a shift position P for engaging a parking brake analogously to FIG. 7.

Figure 9:
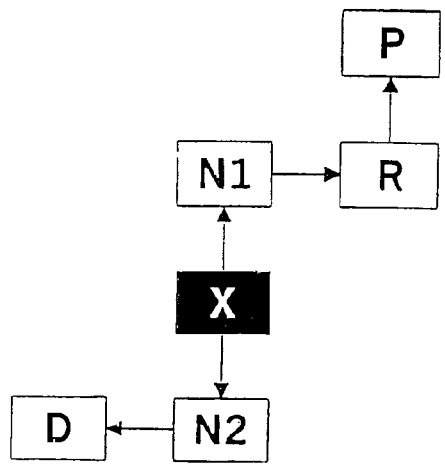
FIG. 9 is a view showing an alternative embodiment to the shift pattern shown in FIG. 5 with the use of a selection means of a signal transmitter according to the present invention, which said selection means can be deflected in four directions.

FIG. 9 shows a shift pattern in which the shift position R for engaging a reverse gear and the shift position D for engaging a forward gear are arranged point-symmetrically in relation to the normal position X. Furthermore, the shift pattern shown in FIG. 9 has a shift position P for engaging a parking brake. As a whole, the individual shift positions have a step-like course.

Figure 10:
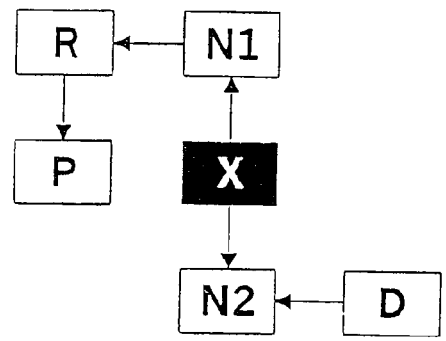
FIG. 10 is a view showing an alternative embodiment to the shift pattern shown in FIG. 5 with the use of a selection means of a signal transmitter according to the present invention, which said selection means can be deflected in four directions.

The shift pattern shown in FIG. 10 is mirror symmetrical to the shift pattern shown in FIG. 9 with the exception of the arrangement of the shift position P.

Figure 11:
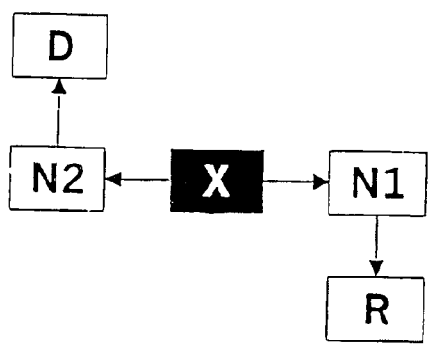
FIG. 11 is a view showing an alternative embodiment to the shift pattern shown in FIG. 3 with the use of a selection means of a signal transmitter according to the present invention, which said selection means can be deflected in four directions.
Figure 12:
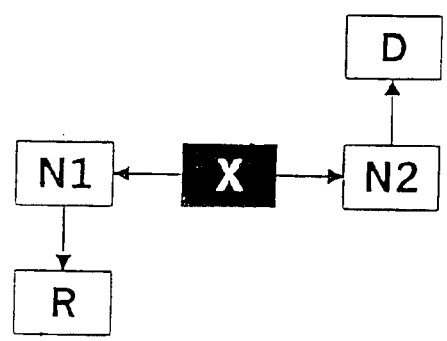
FIG. 12 is a view showing another alternative embodiment to the shift pattern shown in FIG. 3 with the use of a selection means of a signal transmitter according to the present invention, which said selection means can be deflected in four directions.

The shift patterns shown in FIGS. 11 and 12 are likewise mirror symmetrical in relation to one another and differ from the shift patterns shown in FIG. 9 and FIG. 10, among other things, in that in FIGS. 9 and 10, the shift position R is arranged in the forward direction of a vehicle, in which the signal transmitter according to the present invention is mounted, in relation to the normal position X of the selection means, and the shift position D is arranged in the reverse travel direction of the vehicle in relation to the normal position X of the selection means, whereas the shift position R is arranged in the reverse travel direction in relation to the normal position X of the selection means, and the shift position D is arranged in the forward travel direction of the vehicle in relation to the normal position X of the selection means in FIGS. 11 and 12.

Furthermore, FIGS. 11 and 12 differ from FIGS. 9 and 10 in that no shift position P is provided in FIGS. 11 and 12. Furthermore, a drive gear D, R is engaged in FIGS. 11 and 12 by deflecting the selection means in or opposite the direction of travel, whereas a drive gear D, R is engaged in FIGS. 9 and 10 by deflecting the selection means at right angles to the direction of the vehicle.

FIGS. 13 and 14 correspond to FIGS. 11 and 12, but the arrangements of the shift position R for engaging a reverse gear and of the shift position D for engaging a forward gear are transposed.

FIG. 15 shows a signal transmitter with a selection means, which can be deflected in four directions and is designed such that additional devices can be controlled by means of the selection means in addition to the engagement of the operating states of the automatic shifting device of the gear change mechanism, so that the selection means can be designed as a multifunctional element. The shift pattern for setting the operating states of the automatic shifting device of the gear change mechanism corresponds here to the shift pattern shown in FIG. 11, and a shift position P for engaging a parking brake is additionally provided. The additional shift positions S1 and S2 are used to select additional functions of the transmission or of additional devices (e.g., navigation device, radio, etc.).

The selection means of the signal transmitter according to the present invention may be designed, e.g., in the form of a gearshift lever and arranged at a center console of a vehicle (not shown).

However, as is shown in FIG. 16, the selection means is preferably designed in the form of a steering column arm 1 and is connected to a steering column (not shown) of a vehicle in an articulated manner, so that the selection means can be moved in one or more planes of the steering wheel and in planes extending at right angles to the steering wheel planes. The steering column arm 1 has a control knob 2, which is arranged at the end of a steering column arm bar 3, wherein the steering column arm bar 3 is fastened pivotably with its end, not shown, at a steering column of a motor vehicle, which steering column is likewise not shown. The steering column arm 1 is used as a selection means of the signal transmitter according to the present invention and has electric contacts for this purpose at the end of the steering column arm bar 3, which end is not shown. By closing the contacts during the deflection of the steering column arm 1, shift commands are forwarded to an evaluating circuit, not shown, which controls the automatic shifting device of the gear change mechanism as well as optionally additional devices. The steering column arm 1 is articulated to the steering column such that it can be deflected corresponding to the shift patterns shown in FIGS. 1 through 15 and moves automatically back into its normal position after its deflection. Furthermore, the steering column arm 1 shown in FIG. 16 has a knob 4, which is used to send a command for engaging a parking brake in the case of shift patterns that have no separate shift position for engaging a parking brake. Furthermore, the steering column arm 1 has a reverse lock button 5, and the steering column arm 1 can be deflected into a shift position R for engaging a reverse gear only when the reverse lock button 5 is pressed. The signal transmitter according to the present invention may be connected, furthermore, to a display means, not shown, which displays the particular activated operating state of the automatic shifting device of the gear change mechanism.

FIGS. 17–31 show a selection of different shift patterns as they can be embodied with the signal transmitter according to the present invention. The fields with a white background designate unstable positions of the selection means, i.e., positions in which the selection direction is maintained and the selector remains only as long as it is held there. The fields with a white background are designated by the letters R, N, N1, N2, D, P, S1, S2. R denotes here a shift position for engaging a reverse gear, N, N1, N2 denote shift positions for the interruption of the torque transmission in the gear change mechanism, D denotes a shift position for engaging a forward gear, P denotes a shift position for engaging a parking brake, and S1, S2 denote shift positions for first and second additional functions. The fields with a black background, which are designated by X, symbolize the particular stable normal position of the selection means, i.e., the particular position in a shift pattern, in which the selection means remains when it is not deflected, or into which the selection means returns after it had been deflected into an unstable position.

The arrows in FIGS. 17–31 indicate the directions in which the selection means can be deflected starting from a particular position.

FIGS. 17–22 show shift patterns as can be embodied with a signal transmitter, whose selection means is deflectable in three directions only. Besides the simple design of the selection means, the small space requirement for the shift patterns that can be embodied is especially advantageous in signal transmitters with selection means deflectable in three directions.

Figure 17:
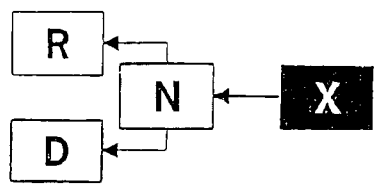
FIG. 17 is a view showing a shift pattern of a selection means of a signal transmitter according to the present invention, which said selection means can be deflected in three directions.

FIG. 17 shows a possible shift pattern according to a preferred embodiment of a signal transmitter according to the present invention, in which the selection means can be deflected in a first direction starting from the normal position X for selecting the shift position N for the interruption of the torque transmission in the gear change mechanism and first in a second position starting from the shift position N for engaging a reverse gear, wherein the second direction is not the opposite direction to the first direction and is different from the first direction, and again in the first direction after the deflection in the second direction. Thus, the deflection movement will have, on the whole, a stepwise course for the selection means for selecting the shift position R for engaging a reverse gear starting from the shift position N. The first direction shown in FIG. 17 may be, e.g., a direction toward an operator of the selection means (driver side) and the second direction may be a forward travel direction of a vehicle, in which the signal transmitter according to the present invention is mounted.

To select the shift position D for engaging a forward gear, the selection means can be deflected first starting from the shift position N in a third direction, which is a direction different from the first and second directions and is not the opposite direction to the first direction, and it can again be deflected in the first direction after the deflection in the third direction. Thus, the deflection movement will again have, on the whole, a stepwise course for the selection means for selecting the shift position D for engaging a forward gear starting from the shift position N. In the shift pattern shown in FIG. 17, the third direction is the opposite direction to the second direction and thus a direction oriented in the reverse travel direction of the vehicle.

The deflection of the selection means between the individual shift positions N and R or N and D takes place preferably without a pause due to a single continuous stepwise deflection movement of the selection means.

Figure 18:
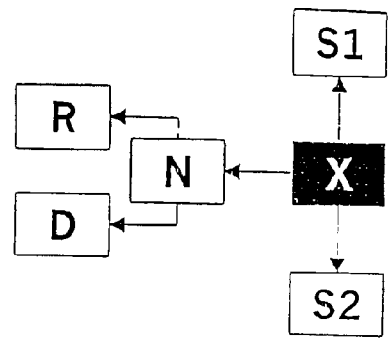
FIG. 18 is a view showing a shift pattern of the selection means of a signal transmitter according to the present invention, which permits the control of additional devices.

An especially preferred embodiment of the shift pattern shown in FIG. 17 is shown in FIG. 18.

FIG. 18 differs from FIG. 17 in that additional devices can be controlled or additional functions can be selected by means of the selection means of the signal transmitter according to the present invention in addition to the setting of the operating states of the automatic shifting device of the gear change mechanism. A first shift position S1 for a first additional function and a second shift position S2 for a second additional function can be selected for this purpose by means of the selection means, in which case the selection means can be deflected for selecting the shift position S1 starting from the normal position X in a direction that is the same as the second direction in FIG. 17 and thus the same as the forward travel direction of the vehicle. To select the shift position S2, the selection means can be deflected starting from the normal position X in a direction that is the same as the third direction in FIG. 17 and thus the same as the reverse travel direction.

The shift positions S1 and S2 may be used, e.g., for the manual shifting of the gear change mechanism, but also to operate a navigation system, a chassis regulation, an air conditioner or to control another device.

Figure 19:
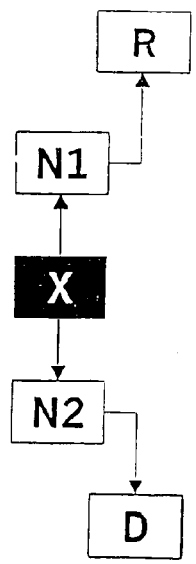
FIG. 19 is a view showing a shift pattern of a selection means of a signal transmitter according to the present invention, which said selection means can be deflected in three directions, and in which said signal transmitter a first shift position and a second shift position are provided for the interruption of the torque transmission in the gear change mechanism.

An embodiment that is an alternative to FIG. 17 is shown in FIG. 19. The shift pattern shown in FIG. 19 differs from the shift pattern shown in FIG. 17 basically in that two shift positions N1, N2 are provided for the interruption of the torque transmission in the gear change mechanism. To select the shift position N1 or N2, the selection means can be deflected starting from the normal position X in a first or second direction, wherein the first direction is not the same as the second direction. In the embodiment shown in FIG. 19, the second direction is the opposite direction to the first direction. To select the shift position R, the selection means can be deflected starting from the shift position N1 first in a third direction, which is different from the first and second directions and is not the opposite direction to the first and second directions, and it can again be deflected in the first or second direction after the deflection in the third direction. Thus, a stepwise course of the deflection movement is obtained, on the whole, for the selection means for selecting the shift position R for engaging a reverse gear starting from the shift position N1.

To select the shift position D, the selection means can be deflected starting from the shift position N2 first in a direction that is likewise the same as the third direction, and it can be deflected in the first or second direction after the deflection in the third direction. Thus, a stepwise course of the deflection movement is again obtained, on the whole, for the selection means for selecting the shift position D for engaging a forward gear starting from the shift position N2.

Figure 20:
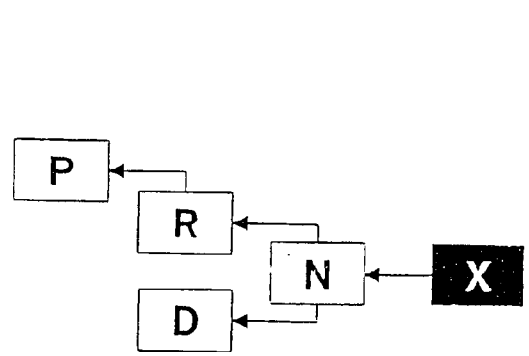
FIG. 20 is a view showing a shift pattern of a selection means of a signal transmitter according to the present invention, which said selection means can be deflected in three direction, and which said signal transmitter additionally has a shift position for engaging a parking brake.

FIG. 20 shows a shift pattern that differs from the shift pattern shown in FIG. 17 in that a shift position P for engaging a parking brake can be additionally selected by means of the selection means, in which case the selection means can be deflected for selecting the shift position P starting from the shift position R first in the second direction in FIG. 17 and consequently in the forward travel direction of the vehicle, and it can be deflected after the deflection in the second direction in a direction that is the same as the first direction in FIG. 17 and is consequently oriented toward an operator of the selection means (driver side). Thus, a stepwise course of the deflection movement is obtained for the selection means for selecting the shift position P for engaging a parking brake starting from the shift position R.

Figure 21:
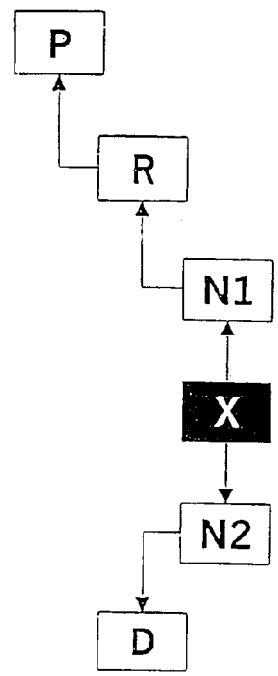
FIG. 21 is a view showing a shift pattern of a selection means of a signal transmitter according to the present invention, which said selection means can be deflected in three directions, and in which said signal transmitter a first shift position and a second shift position are provided for the interruption of the torque transmission in the gear change mechanism, and which additionally has a shift position for engaging a parking brake.

FIG. 21 shows a variant of the shift pattern shown in FIG. 19, which has a shift position P for engaging a parking brake analogously to FIG. 20.

Figure 22:
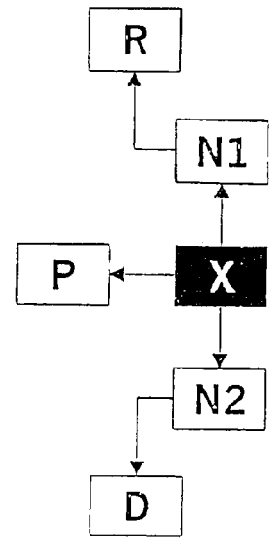
FIG. 22 is a view showing an alternative embodiment to the shift pattern shown in FIG. 21.

FIG. 22 shows a shift pattern, which permits directly the selection of the shift position P starting from the normal position X by the deflection of the selection means in a direction that was called the "third direction" in connection with FIG. 19. Among other things, the extremely small space requirement can be considered to be the advantage of the shift pattern according to FIG. 22.

FIGS. 23–31 show shift patterns as can be embodied with a signal transmitter according to the present invention, whose selection means can be deflected in four directions. This makes it possible to markedly increase the number of shift patterns that can be embodied.

Figure 23:
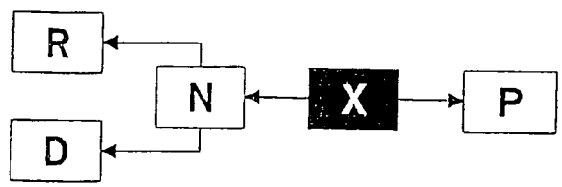
FIG. 23 is a view showing an alternative embodiment to the shift pattern shown in FIG. 20 with the use of a selection means of a signal transmitter according to the present invention, which said selection means can be deflected in four directions.

The shift pattern shown in FIG. 23 uses the shifting described in connection with FIG. 17 and differs from this in that the selection means can be deflected for selecting the shift position P starting from the normal position X in a fourth direction, which is different from the first, second and third directions described in connection with FIG. 17. The fourth direction in FIG. 23 corresponds to the deflection of the selection means away from an operator of the selection means and consequently toward the passenger side.

Figure 24:
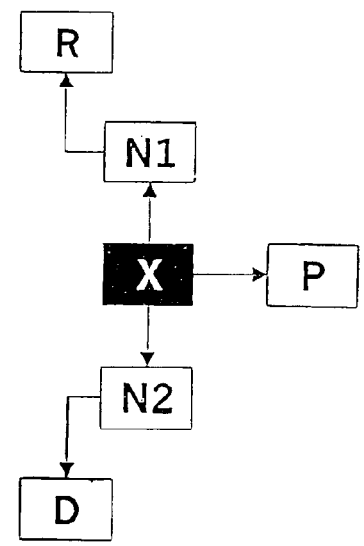
FIG. 24 is a view showing an alternative embodiment to the shift pattern shown in FIG. 22 with the use of a selection means of a signal transmitter according to the present invention, which said selection means can be deflected in four directions.

The shift pattern described in connection with FIG. 19 is again used in FIG. 24, and the shift pattern shown in FIG. 24 additionally shows a shift position P that can be reached directly from the normal position X for engaging a parking brake.

Figures 25, 26:
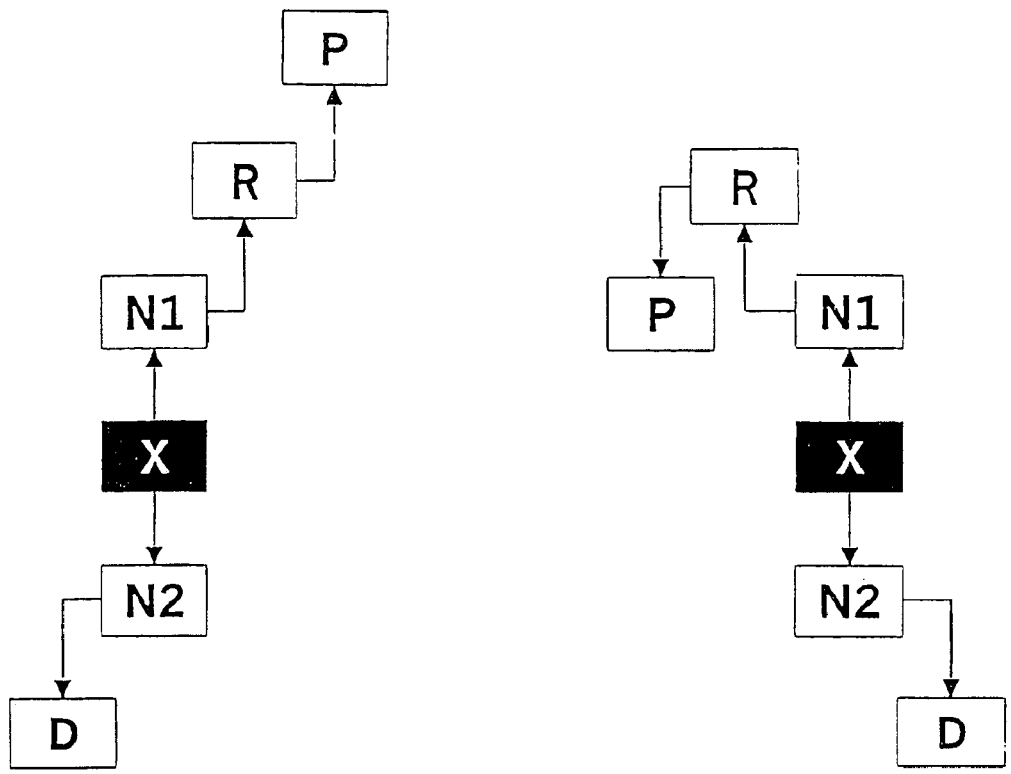
FIG. 25 is a view showing an alternative embodiment to the shift pattern shown in FIG. 21 with the use of a selection means of a signal transmitter according to the present invention, which said selection means can be deflected in four directions.
FIG. 26 is a view showing another alternative embodiment to the shift pattern shown in FIG. 21 with the use of a selection means of a signal transmitter according to the present invention, which said selection means can be deflected in four directions.

FIG. 25 shows a shift pattern in which the shift position R for engaging a reverse gear and the shift position D for engaging a forward gear are arranged point-symmetrically in relation to the normal position X. Furthermore, the shift pattern shown in FIG. 25 has a shift position P for engaging a parking brake. On the whole, a stepwise arrangement of the individual shift positions of the selection means is thus obtained.

The shift pattern shown in FIG. 26 is mirror symmetrical to the shift pattern shown in FIG. 25 with the exception of the arrangement of the shift position P. Due to the reversal of the basic deflection direction of the selection means for selecting the shift position P, accidental engagement of the parking brake is additionally made difficult.

Figure 27:
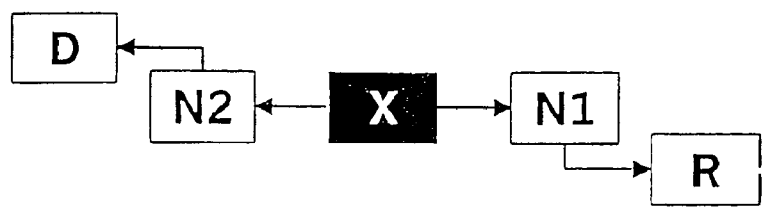
FIG. 27 is a view showing an alternative embodiment to the shift pattern shown in FIG. 19 with the use of a selection means of a signal transmitter according to the present invention, which said selection means can be deflected in four directions.
Figure 28:
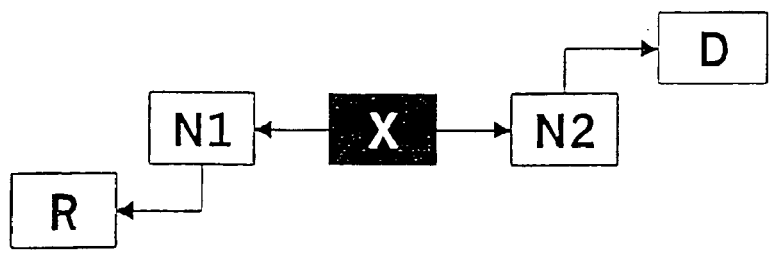
FIG. 28 is a view showing another alternative embodiment to the shift pattern shown in FIG. 19 with the use of a selection means of a signal transmitter according to the present invention, which said selection means can be deflected in four directions.

The shift patterns shown in FIGS. 27 and 28 are likewise mirror symmetrical in relation to one another and differ from the shift patterns shown in FIG. 25 and FIG. 26, among other things, in that the shift position R is arranged in FIGS. 25 and 26 in the forward direction of a vehicle, in which the signal transmitter according to the present invention is mounted, in relation to the normal position X of the selection means, and the shift position D is arranged in the reverse travel direction of the vehicle in relation to the normal position X of the selection means, whereas the shift position R is arranged in FIGS. 27 and 28 in the reverse travel direction in relation to the normal position X of the selection means, and the shift position D is arranged in the forward travel direction of the vehicle in relation to the normal position X of the selection means. Furthermore, FIGS. 27 and 28 differ from FIGS. 25 and 26 in that no shift position P is provided in FIGS. 27 and 28. Furthermore, the basic deflection direction of the selection means between the individual shift positions N1, N2, R, P, D is not oriented in the longitudinal direction of the vehicle, as in FIGS. 25 and 26, but in the transverse direction of the vehicle.

Figure 29:
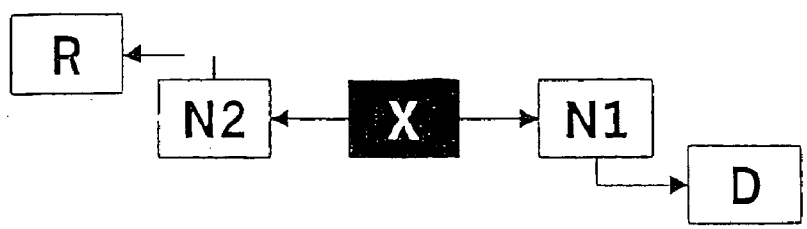
FIG. 29 is a view showing an alternative embodiment to the shift pattern shown in FIG. 19 with the use of a selection means of a signal transmitter according to the present invention, which said selection means can be deflected in four directions.
Figure 30:
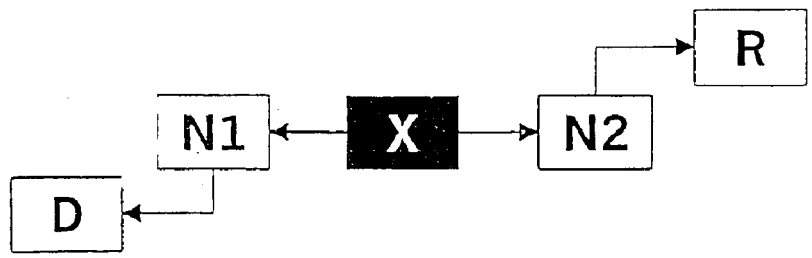
FIG. 30 is a view showing an alternative embodiment to the shift pattern shown in FIG. 19 with the use of a selection means of a signal transmitter according to the present invention, which said selection means can be deflected in four directions.

FIGS. 29 and 30 correspond to FIGS. 27 and 28, and the arrangement of the shift position R for engaging the reverse gear and the shift position D for engaging the forward gear are transposed.

Figure 31:
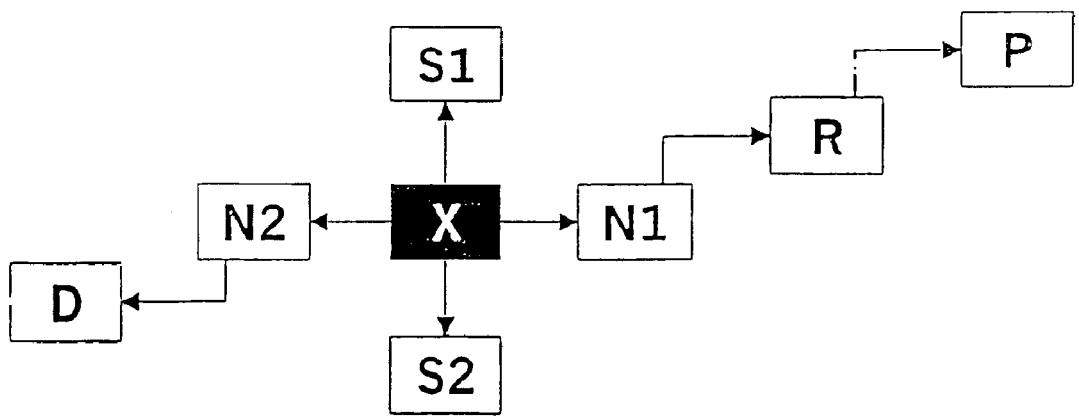
FIG. 31 is a view showing a shift pattern of a selection means of a signal transmitter according to the present invention, which said selection means can be deflected in four directions, and in which said signal transmitter a first shift position and a second shift position are provided for the interruption of the torque transmission in the gear change mechanism, wherein the signal transmitter permits the control of additional devices, and it additionally has a shift position for engaging a parking brake.

FIG. 31 shows a signal transmitter with a selection means, which can be deflected in four directions and is designed such that additional devices can be controlled by means of the selection means in addition to the setting of the operating states of the automatic shifting device of the gear change mechanism, so that the selection means can be designed as a multifunctional element.

The shift pattern for setting the operating states of the automatic shifting device of the gear change mechanism corresponds here to the shift pattern shown in FIG. 27, and a shift position P for engaging a parking brake is additionally provided here. The additional shift positions S1 and S2 are used to select additional functions of the transmission or to operate additional devices (e.g., navigation device, radio, etc.).

The selection means of the signal transmitter according to the present invention may be designed, e.g., in the form of a gearshift lever and arranged at a center console of a vehicle.

However, the selection means is preferably designed as a steering column arm and is connected to a steering column of a vehicle in an articulated manner, so that the selection means can be moved in one or more planes of the steering wheel and in planes extending at right angles to those planes. The steering column arm has a control knob, which is arranged at one end of a steering column arm bar, wherein the steering column arm bar is pivotably fastened with its other end to the steering column of the motor vehicle. The steering column arm is used as a selection means of the signal transmitter according to the present invention and has electric contacts for this purpose at its steering column arm bar end connected to the steering column. By closing the contacts during the deflection of the steering column arm, shift commands are forwarded to an evaluating circuit, which controls the automatic shifting device of the gear change mechanism as well as optionally additional devices. The steering column arm is articulated to the steering column such that it can be deflected corresponding to the shift patterns shown in FIGS. 17 through 31 and moves automatically back into its normal position after a deflection. Furthermore, the steering column arm preferably has a knob, which is used to send a command for engaging a parking brake in the shift patterns that have no separate shift position for engaging a parking brake. Furthermore, the steering column arm preferably has a reverse lock button, in which case the steering column arm can be deflected into a shift position R for engaging a reverse gear only when the return lock button is pressed.

The signal transmitter according to the present invention may, furthermore, be connected to a display means, which displays the particular activated operating state of the automatic shifting device of the gear change mechanism.

While specific embodiments of the invention have been shown and described in detail to illustrate the application of the principles of the invention, it will be understood that the invention may be embodied otherwise without departing from such principles.

What is claimed is:

1. A signal transmitter for setting the operating states of an automatic gear shifting device of a gear change mechanism, the signal transmitter comprising:
a selection means deflectable in directions and automatically returning into a normal position that is stable from at least for certain unstable shift positions, said directions including:
a first direction for selecting a shift position for interruption of torque transmission in the gear change mechanism starting from said normal position; and
other directions that are different from the first direction and not the opposite direction to the first direction, said selection means being deflected, starting from said shift position, in said other directions for selecting at least one reverse shift position for engaging a reverse gear and a forward shift position for engaging a forward gear, wherein said shift position, said reverse shift position, and said forward shift position comprise said certain unstable shift positions.

2. A signal transmitter in accordance with claim 1, wherein said selection means can be deflected for selecting said shift position that is unstable for engaging a reverse gear starting from said shift position that is unstable for the interruption of the torque transmission in the gear change mechanism in a second direction, which is not the opposite direction to the first direction and is different from the first direction, and said selection means can be deflected for selecting said shift position that is unstable for engaging a forward gear starting from said shift position that is unstable for the interruption of the torque transmission in the gear change mechanism in a third direction that is different from the first and second directions and is not the opposite direction to the first direction.

3. A signal transmitter in accordance with claim 1, wherein the signal transmitter controls additional devices via said selection means in addition to the setting of the operating states of the automatic shifting device of the gear change mechanism.

4. A signal transmitter in accordance with claim 3, wherein a shift position that is unstable for a first additional function and a shift position that is unstable for a second additional function are additionally selectable by said selection means, and said selection means is deflectable in a direction that is the same as the second direction starting from said normal position that is stable for selecting said shift position that is unstable for a first additional function, and said selection means is deflectable in a direction that is the same as the third direction starting from said normal position that is stable for selecting said shift position that is unstable for a second additional function.

5. A signal transmitter in accordance with claim 1, wherein a first shift position that is unstable and a second shift position that is unstable interrupt the torque transmission in the gear change mechanism, said selection means being deflectable for selecting said first and second shift positions for the interruption of the torque transmission in the gear change mechanism starting from said normal position that is stable in said first or in a second direction, wherein said first direction is not the same as said second direction, said selection means being deflectable for selecting said shift position that is unstable for engaging a reverse gear starting from said first shift position that is unstable for the interruption of the torque transmission in the gear change mechanism in a third direction that is different from said first and second directions and is not the opposite direction to said first and second directions, and said selection means is deflectable for selecting said shift position that is unstable for engaging a forward gear starting from said second shift position that is unstable for the interruption of the torque transmission in the gear change mechanism in a direction that is the same as the third direction.

6. A signal transmitter in accordance with claim 1, wherein a shift position that is unstable for engaging a parking brake is additionally selectable by said selection means.

7. A signal transmitter in accordance with claim 6, wherein for selection of said shift position that is unstable for engaging a parking brake, said selection means is deflectable starting from said shift position that is unstable for engaging a reverse gear in a direction that is the same as said first direction.

8. A signal transmitter in accordance with claim 6, wherein to select said shift position that is unstable for engaging a parking brake, said selection means is deflectable starting from said normal position that is stable in a direction that is the same as said third direction.

9. A signal transmitter in accordance with claim 1, wherein said selection means can be deflected in four directions.

10. A signal transmitter in accordance with claim 9, wherein for selecting said shift position that is unstable for engaging a parking brake, said selection means is deflectable starting from said normal position that is stable in a fourth direction that is different from said first, second and said third directions.

11. A signal transmitter in accordance with claim 9, wherein first and second shift positions are provided for the interruption of the torque transmission in the gear change mechanism, said selection means being deflectable for selecting said first or second shift position that is unstable for the interruption of the torque transmission in the gear change mechanism starting from said normal position that is stable in said first or in a second direction, wherein said first direction is not the same as said second direction, said selection means being deflectable for selecting said shift position that is unstable for engaging a reverse gear starting from said first shift position that is unstable for the interruption of the torque transmission in the gear change mechanism in a third direction, which is different from said first and second directions and is not the opposite direction to said first and second directions, and said selection means is deflectable for selecting said shift position that is unstable for engaging a forward gear starting from said second shift position that is unstable for the interruption of the torque transmission in the gear change mechanism in a fourth direction, which is different from said first, second and third directions and is not the opposite direction to said first and second directions.

12. A signal transmitter in accordance with claim 11, wherein to select said shift position that is unstable for engaging a parking brake, said selection means is deflectable starting from said shift position that is unstable for engaging a reverse gear in a direction that is the same as said first or second direction.

13. A signal transmitter in accordance with claim 11, wherein a shift position that is unstable for a first additional function and a shift position that is unstable for a second additional function are additionally selectable by means of said selection means, said selection means being deflectable for selecting said shift position that is unstable for a first additional function starting from said normal position that is stable in a direction that is the same as said third direction, said selection means being deflectable for selecting said shift position that is unstable for a second additional function starting from said normal position that is stable in a direction that is the same as the fourth direction.

14. A signal transmitter in accordance with claim 1, further comprising: a park button and a parking brake engagable by pressing said park button.

15. A signal transmitter in accordance with claim 14, wherein said park button is arranged at said selection means.

16. A signal transmitter in accordance with claim 1, further comprising: a reverse lock button, said selection mean being deflectable for selecting said shift position that is unstable for engaging a reverse gear only when said reverse lock button is pressed.

17. A signal transmitter in accordance with claim 16, wherein said reverse lock button is arranged at said selection means.

18. A signal transmitter in accordance with claim 1, wherein the signal transmitter is mounted in a vehicle.

19. A signal transmitter in accordance with claim 18, wherein said shift position that is unstable for engaging a reverse gear is arranged in the forward travel direction of the vehicle in relation to said normal position that is stable of said selection means and said shift position that is unstable for engaging a forward gear is arranged in the reverse travel direction of the vehicle in relation to said normal position that is stable of said selection means.

20. A signal transmitter in accordance with claim 18, wherein said shift position that is unstable for engaging a reverse gear is arranged in the reverse travel direction of the vehicle in relation to said normal position that is stable of said selection means and said shift position that is unstable for engaging a forward gear is arranged in the forward travel direction of the vehicle in relation to said normal position that is stable of said selection means.

21. A signal transmitter in accordance with claim 18, wherein said shift position that is unstable for engaging a reverse gear and said shift position that is unstable for engaging a forward gear are arranged point-symmetrically in relation to said normal position that is stable of said selection means.

22. A signal transmitter in a accordance with claim 18, wherein said selection means comprises a steering column arm arranged at a steering column of the vehicle.

23. A signal transmitter in accordance with claim 18, wherein said selection means comprises a gearshift lever arranged at a center console of the vehicle.

24. A signal transmitter for setting the operating states of an automatic shifting device of a gear change mechanism, the signal transmitter comprising:
  a selection means deflectable in at least three directions to three unstable positions and automatically returning into a normal position that is stable from certain the unstable shift positions, the unstable shift positions include at least one shift position for interrupting torque transmission in the gear change mechanism and a shift position for engaging a forward gear, said selection means being deflectable in a first direction for selecting said shift position for the interruption of the torque transmission in the gear change mechanism starting from said normal position that is stable and said selection means being deflectable in another direction that is different from said first direction and is not the opposite direction to said first direction, said another direction for selecting one of said additional shift positions starting from said shift position for the interruption of the torque transmission in the gear change mechanism, and said selection means being deflectable in the first direction after the deflection in said another direction.

25. A signal transmitter in accordance with claim 24, wherein said selection means is deflectable for selecting said shift position that is unstable for engaging a reverse gear starting from said shift position that is unstable for the interruption of the torque transmission in the gear change mechanism first in a second direction, which is not the opposite direction to the first direction and is different from the first direction, and said selection means is deflectable in said first direction after the deflection in the second direction, and said selection means is deflectable for selecting said shift position that is unstable for engaging a forward gear starting from said shift position that is unstable for the interruption of the torque transmission in the gear change mechanism first in a third direction, which is a direction different from said first and second directions and is not the opposite direction to said first direction, and said selection means is deflectable in said first direction after a deflection in said third direction.

26. A signal transmitter in accordance with claim 24, wherein said selection means controls additional devices in addition to the setting of the operating states of the automatic shifting device.

27. A signal transmitter in accordance with claim 26, wherein a shift position that is unstable for a first additional function and a shift position that is unstable for a second additional function are additionally selectable by said selection means and said selection means is deflectable in a direction that is the same as said second direction starting from said normal position that is stable for selecting said shift position that is unstable for a first additional function, and that said selection means is deflectable in a direction that is the same as the third direction starting from said normal position that is stable for selecting said shift position that is unstable for a second additional function.

28. A signal transmitter in accordance with claim 24, wherein said first and second shift positions are provided for the interruption of the torque transmission in the gear change mechanism, said selection means being deflectable for selecting said first or second shift position that is unstable for the interruption of the torque transmission in the gear change mechanism starting from said normal position that is stable in a first or second direction, wherein said first direction is not the same as said second direction, said selection means being deflectable for selecting said shift position that is unstable for engaging a reverse gear starting from said first shift position that is unstable for the interruption of the torque transmission in the gear change mechanism first in a third direction, which is different from the first and second directions and is not the opposite direction to the first and second directions, and it can again be deflected in the first or second direction after the deflection in the third direction, and that said selection means can be deflected for selecting said shift position that is unstable for engaging a forward gear starting from said second shift position that is unstable for the interruption of the torque transmission in the gear change mechanism first in a direction that is the same as the third direction, and said selection means is deflectable in the first or second direction after the deflection in the third direction.

29. A signal transmitter in accordance with claim 24, wherein a shift position that is unstable for engaging a parking brake can be selected by said selection means.

30. A signal transmitter in accordance with claim 29, wherein to select said shift position that is unstable for engaging a parking brake, said selection means is deflected starting from said shift position that is unstable for engaging a reverse gear first in the respective other direction, and after a deflection in the respective other direction, said selection means is deflectable in a direction that is the same as said first direction or is the opposite direction to said first direction.

31. A signal transmitter in accordance with claim 24, wherein said selection means is deflectable in four directions.

32. A signal transmitter in accordance with claim 31, wherein said first and a second shift position that is unstable is provided for the interruption of the torque transmission in the gear change mechanism, said selection means being deflectable for selecting said first or second shift position that is unstable for the interruption of the torque transmission in the gear change mechanism starting from said normal position that is stable in a first or second direction, wherein said first direction is not the same as said second direction, said selection means being deflectable for selecting said shift position that is unstable for engaging a reverse gear stating from said first shift position that is unstable for the interruption of the torque transmission in the gear change mechanism first in a third direction, which is different from the first and second directions and is not the opposite direction to the first and second directions, and selection means is deflectable in the first or second direction after the deflection in the third direction, and said selection means is deflectable for selecting said shift position that is unstable for engaging a forward gear starting from said second shift position that is unstable for the interruption of the torque transmission in the gear change mechanism first in a fourth direction, which is different from said first, second and third directions and is not the opposite direction to said first and second directions, and said selection means is deflectable in the first or second direction after the deflection in the fourth direction.

33. A signal transmitter in accordance with claim 32, wherein to select a shift position that is unstable for engaging a parking brake, said selection means is deflectable first in the third or fourth direction starting from said shift position that is unstable for engaging a reverse gear, and said selection means is deflectable in a direction that is the same as the first or second direction after the deflection in the third or fourth direction.

34. A signal transmitter in accordance with claim 32, wherein a shift position that is unstable for a first additional function and a shift position that is unstable for a second additional function can be additionally selected by means of said selection means and said selection means is deflectable in a direction that is the same as the third direction starting from said normal position that is stable for selecting said shift position that is unstable for a first additional function, and said selection means is deflectable in a direction that is the same as the fourth direction starting from said normal position that is stable for selecting said shift position that is unstable for a second additional function.

35. A signal transmitter for setting the operating states of automatically shifting gears, said signal transmitter comprising:

a selection means starting from a normal stable position and deflectable to unstable shift positions and automatically returning back to said normal stable position, said unstable shift positions being reached by movement of the selection means in:

a first direction for selecting an at least one of a first neutral shift position for interruption of torque transmission and a second neutral shift position in the gear change mechanism starting from said normal position;

a second direction for selecting a forward shift position for engaging a forward gear, said second direction being a forward direction different from said first direction and not being the opposite direction to said first direction, said selection means being deflected, starting from one of said first neutral shift position and said second neutral shift position; and a third direction for selecting a reverse shift position for engaging a reverse gear, said third direction being a reverse direction different from said first direction and not being the opposite direction to said first direction, said selection means being deflected, starting from one of said first neutral shift position and said second neutral shift position.

36. A signal transmitter according to claim 35, wherein said selection means for at least one of said second direction and said third direction is deflected to at least one of said first direction and the opposite direction to said first direction.

37. A signal transmitter according to claim 35, wherein only one neutral position of said first neutral position and said second neutral position is provided with said second direction starting from said only one neutral position and said third direction starting from said only one neutral position.

38. A signal transmitter according to claim 1, wherein said shift position includes a first neutral shift position portion from which said selection means is deflected for selecting said reverse shift position; and a second neutral shift position portion from which said selecting means is moved for selecting said forward shift position.

39. A signal transmitter according to claim 24, wherein said shift position includes a first neutral shift position portion from which said selection means is deflected for selecting said reverse shift position; and a second neutral shift position portion from which said selecting means is moved for selecting said forward shift position.

40. A signal transmitter according to claim 1, wherein said shift position is at least one of a first neutral position and a second neutral position.

41. A signal transmitter according to claim 24, wherein said shift position is at least one of a neutral position and a second neutral position.

* * * * *